United States Patent
Choi et al.

(10) Patent No.: US 8,053,732 B2
(45) Date of Patent: Nov. 8, 2011

(54) TERAHERTZ WAVE TX/RX MODULE PACKAGE AND METHOD OF MANUFACTURING THE SAME

(75) Inventors: Sang Kuk Choi, Daejeon (KR); Kwang Yong Kang, Daejeon (KR); Mun Cheol Paek, Daejeon (KR); Min Hwan Kwak, Daejeon (KR); Seung Beom Kang, Chungcheongbuk-Do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 194 days.

(21) Appl. No.: 12/537,445

(22) Filed: Aug. 7, 2009

(65) Prior Publication Data

US 2010/0155605 A1 Jun. 24, 2010

(30) Foreign Application Priority Data

Dec. 22, 2008 (KR) .................. 10-2008-0131596

(51) Int. Cl.
*G01J 5/02* (2006.01)
(52) U.S. Cl. ...................... 250/341.1; 385/91
(58) Field of Classification Search .............. 385/91, 385/90; 359/506; 250/341.1
See application file for complete search history.

(56) References Cited

U.S. PATENT DOCUMENTS

| | | | | |
|---|---|---|---|---|
| 5,663,639 | A * | 9/1997 | Brown et al. | 324/96 |
| 5,789,750 | A | 8/1998 | Nuss | |
| 6,816,647 | B1 * | 11/2004 | Rudd et al. | 385/37 |
| 7,163,343 | B2 * | 1/2007 | Matta et al. | 385/88 |

FOREIGN PATENT DOCUMENTS

| | | |
|---|---|---|
| JP | 2006145372 A | 6/2006 |
| JP | 2008134094 A | 6/2008 |
| JP | 2008244620 A | 10/2008 |
| KR | 1020050026491 A | 3/2005 |
| KR | 1020080070622 A | 7/2008 |

OTHER PUBLICATIONS

S. Coleman et al., "Parallel plate THz transmitter", Applied Physics Letters, vol. 84, No. 5, Feb. 2, 2004, pp. 654-656.

* cited by examiner

*Primary Examiner* — Constantine Hannaher
(74) *Attorney, Agent, or Firm* — Rabin & Berdo, P.C.

(57) ABSTRACT

Provided are a terahertz wave transmission and reception (Tx/Rx) module package and method of manufacturing the same. The complete and separate terahertz wave Tx/Rx module package is implemented by simply aligning a silicon ball lens, a photoconductive antenna and a focusing lens, and thus facilitates generation or measurement of a terahertz wave. The terahertz wave Tx/Rx module package and method can remarkably reduce time and cost required to build a terahertz wave generation and measurement system, and simplify and miniaturize the terahertz wave generation and measurement system. In addition, characteristics of a terahertz wave generated by the photoconductive antenna can be simply measured. Furthermore, the terahertz wave Tx/Rx module package can be stored and transported with a photoconductive antenna, a silicon ball lens and a focusing lens kept aligned as they are, and also it is possible to minimize pollution of terahertz wave devices caused by surroundings.

16 Claims, 4 Drawing Sheets

TERAHERTZ WAVE TX/RX MODULE PACKAGE AND METHOD OF MANUFACTURING THE SAME

CROSS-REFERENCE TO RELATED APPLICATION

This application claims priority to and the benefit of Korean Patent Application No. 10-2008-0131596, filed Dec. 22, 2008, the disclosure of which is incorporated herein by reference in its entirety.

BACKGROUND

1. Field of the Invention

The present invention relates to a terahertz wave transmission and reception (Tx/Rx) module package and method of manufacturing the same, and more particularly to a technique for simply aligning a silicon ball lens, a photoconductive antenna and a focusing lens to implement a complete and separate terahertz wave Tx/Rx module package.

2. Discussion of Related Art

Terahertz waves are electromagnetic waves ranging from 100 GHz to 10 THz between infrared rays and microwaves. Lately, terahertz waves have been approved as future electric wave resources due to the development of high technology. Accordingly, terahertz waves are attracting attention all over the world, and becoming more important in various fields through fusion with information technology (IT), bio technology (BT), etc.

In particular, terahertz waves transmit through various materials like electric waves while traveling straight like visible rays, and thus can be used in basic science, such as physics, chemistry, biology and medical science. Since terahertz waves can be used to detect counterfeit bills, drugs, explosives, biochemical weapons, etc., and to non-destructively examine industrial structures, they are also expected to be extensively used in fields of general industry, national defense, security, etc. Furthermore, terahertz technology is expected to be extensively used for wireless communication at 40 Gb/s or higher, high-speed data processing and inter-satellite communication in the IT field.

Terahertz waves can be classified into continuous waves and pulse waves. In general, the pulse terahertz waves are generated by radiating a femtosecond ($10^{-15}$ second) laser onto a special semiconductor or optical crystal. This will be described below in further detail.

FIG. 1 illustrates a method of generating a pulse terahertz wave by radiating a femtosecond laser onto a photoconductive antenna.

Referring to FIG. 1, a photoconductive antenna 100 includes a photoconductive thin film 120 formed on a semi-insulating GaAs substrate 110, and parallel metal transmission lines (also functioning as electrodes) 130 formed on the photoconductive thin film 120 and having middle protrusions. Here, the middle protrusions of the parallel metal transmission lines 130 function as a small dipole antenna.

When excitation is intermittently performed using laser pulse light fs having a time width of 100 femtoseconds or less with a bias voltage Vb applied to the parallel metal transmission lines 130, carriers (electrons and holes) are generated by light absorption, and current instantly flows through the parallel metal transmission lines 130. As a result, a terahertz wave (dipole radiation) proportional to a value obtained by differentiating the current with respect to time is generated.

The generated terahertz wave is intensely radiated from the surface of the substrate 110 having high permittivity, and the pulse width of the radiated terahertz wave is 1 ps or less. When light excitation is performed using a general-use laser pulse of 30 fs or more, a spectrum obtained by Fourier transform has a broad frequency band from 0 to several terahertz.

In order to radiate a terahertz wave from a substrate surface as mentioned above, a femtosecond laser pulse should be focused onto the photoconductive antenna 100 through a focusing lens and transformed into the frequency domain, and then focused again onto a predetermined region through a silicon ball lens.

According to conventional art, all devices such as a focusing lens, a photoconductive antenna, and a silicon ball lens are mounted and aligned on an optical table to manufacture a terahertz wave Tx/Rx module. Thus, to precisely bring the devices into surface contact with each other, a high precision alignment technique is necessary.

In particular, when a photoconductive antenna and a hemispherical silicon ball lens are brought into surface contact with each other, surfaces of the photoconductive antenna and the silicon ball lens may be scratched, an alignment error may occur, and an additional fixing means is needed to keep the photoconductive antenna and the silicon ball lens aligned.

Also, a wire should be directly connected with a photoconductive antenna using a conductive adhesive or indium bonding in order to test characteristics of a generated terahertz wave, and should be removed again using the conductive adhesive or indium bonding after the test is finished. Thus, it is very troublesome and difficult to test characteristics of the terahertz wave while keeping the photoconductive antenna and the silicon ball lens aligned as they are.

Furthermore, alignment of the focusing lens, the photoconductive antenna and the silicon ball lens may be easily disturbed during transportation and storage, and the devices may be easily damaged or polluted by surroundings.

SUMMARY OF THE INVENTION

The present invention is directed to providing a terahertz wave transmission and reception (Tx/Rx) module package that can be simply manufactured, and easily generate and measure a terahertz wave.

More specifically, the present invention is directed to implementing a complete and separate terahertz wave Tx/Rx module package by simply aligning a silicon ball lens, a photoconductive antenna and a focusing lens, and facilitating generation or measurement of a terahertz wave.

One aspect of the present invention provides a terahertz wave Tx/Rx module package comprising: a photoconductive antenna formed on a substrate and having an active region in the middle; a silicon ball lens aligned under the substrate; a focusing lens for focusing a femtosecond laser pulse; a focusing lens aligner for aligning the focusing lens with an active region center of the photoconductive antenna; upper and lower fixers for opening areas perpendicularly above and below the active region of the photoconductive antenna; and upper and lower covers for sealing off the open areas of the upper and lower fixers.

An external terminal may be connected with the active region center of the photoconductive antenna, and the silicon ball lens may be fixed on a cylinder-shaped sleeve surrounding a side surface of the silicon ball lens.

The focusing lens aligner may include: an internal flange having the focusing lens installed therein, and moving it up and down; and an external flange formed to surround the internal flange, and moving the focusing lens left and right.

The internal flange may move the focusing lens up and down using a fastening bolt and a metal ball, and the external flange may be inserted into a groove formed on a flange of the upper fixer for surface-contact and move the focusing lens left and right along the groove.

A center of the focusing lens may be aligned with the active region center of the photoconductive antenna by up and down movement of the internal flange and left and right movement of the external flange. After the center of the focusing lens is aligned with the active region center of the photoconductive antenna, the external flange may be fixed on the flange of the upper fixer.

The upper and lower fixers may open the areas perpendicularly above and below the active region of the photoconductive antenna while installing and fixing the photoconductive antenna therein using a fastening means, and the upper and lower covers may be respectively combined with the upper and lower fixers and seal off the open areas of the upper and lower fixers.

Another aspect of the present invention provides a method of manufacturing a terahertz wave Tx/Rx module package, the method comprising: forming a photoconductive antenna having an active region for terahertz wave radiation or detection on a substrate; opening areas perpendicularly above and below the active region of the photoconductive antenna using upper and lower fixers; aligning and fixing a silicon ball lens under the substrate; aligning a center of a focusing lens with an active region center of the photoconductive antenna using an internal flange capable of moving up and down and an external flange capable of moving left and right; and keeping the focusing lens and the photoconductive antenna aligned.

The forming of the photoconductive antenna may further include connecting an external terminal with the active region center of the photoconductive antenna, and the opening of the areas perpendicularly above and below the active region may include opening the areas perpendicularly above and below the active region of the photoconductive antenna while installing and fixing the photoconductive antenna in the upper and lower fixers using a fastening means. Also, the aligning and fixing of the silicon ball lens may further include fixing the silicon ball lens on a cylinder-shaped sleeve surrounding a side surface of the silicon ball lens.

The aligning of the center may include: installing the focusing lens in the internal flange, and then moving the internal flange up and down; and inserting the external flange surrounding the internal flange into a groove formed on a flange of the upper fixer for surface-contact, and then moving the external flange left and right along the groove.

The keeping of the focusing lens may include fixing the external flange on the flange of the upper fixer after aligning the center of the focusing lens with the active region center of the photoconductive antenna. The method may further include, after keeping the focusing lens, forming upper and lower covers sealing off the open areas of the upper and lower fixers.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below but can be implemented in various forms. The following embodiments are described in order to enable those of ordinary skill in the art to embody and practice the present invention.

Figure 1:
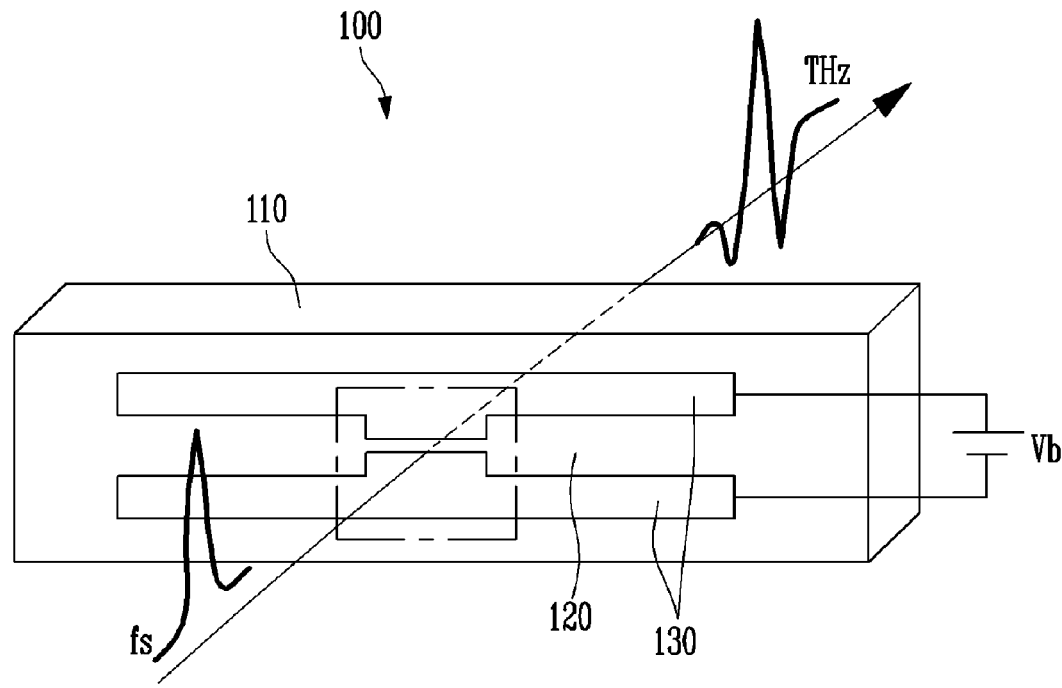
FIG. 1 illustrates a method of generating a pulse terahertz wave by radiating a femtosecond laser onto a photoconductive antenna.
Figure 2:
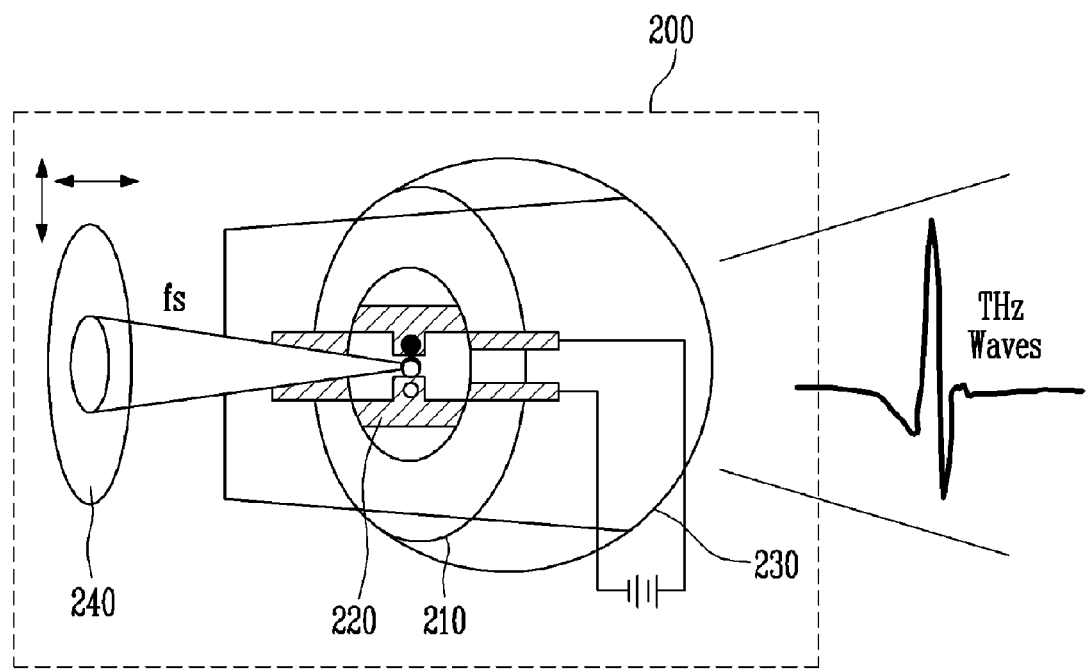
FIG. 2 illustrates the basic structure of a terahertz wave transmission and reception (Tx/Rx) module package according to an exemplary embodiment of the present invention.
Figure 3:
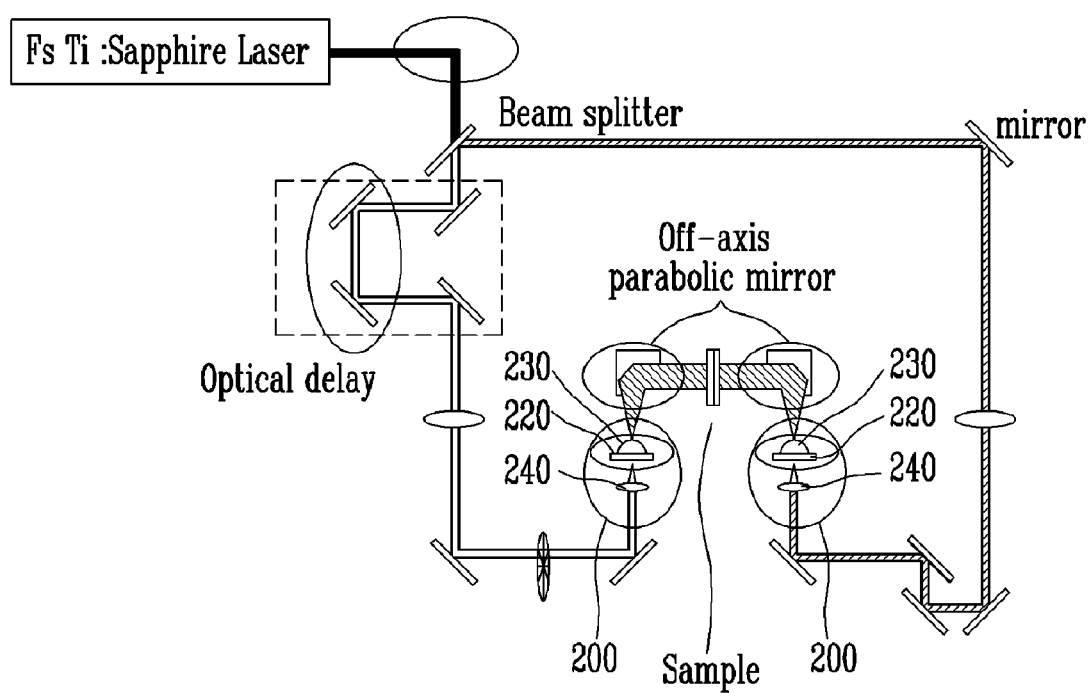
FIG. 3 schematically shows a terahertz wave generation and measurement system employing the terahertz wave Tx/Rx module package shown in FIG. 2.

FIG. 2 illustrates the basic structure of a terahertz wave transmission and reception (Tx/Rx) module package 200 according to an exemplary embodiment of the present invention, and FIG. 3 schematically shows a terahertz wave generation and measurement system employing the terahertz wave Tx/Rx module package 200 shown in FIG. 2.

Referring to FIGS. 2 and 3, a silicon ball lens 230 is aligned and bonded with a photoconductive antenna 220, the position of a focusing lens 240 is adjusted, and then the focusing lens 240 is aligned with the photoconductive antenna 220, thereby completing the terahertz wave Tx/Rx module 200.

In other words, the present invention suggests a package structure in which the photoconductive antenna 220, the silicon ball lens 230 and the focusing lens 240 can be precisely aligned without using a high-precision alignment technique.

Thus, the terahertz wave Tx/Rx module 200 according to an exemplary embodiment of the present invention can easily generate or measure a terahertz wave using a simpler structure than a conventional structure. Consequently, it is possible to remarkably reduce time and cost required to build a terahertz wave generation and measurement system.

Figure 4:
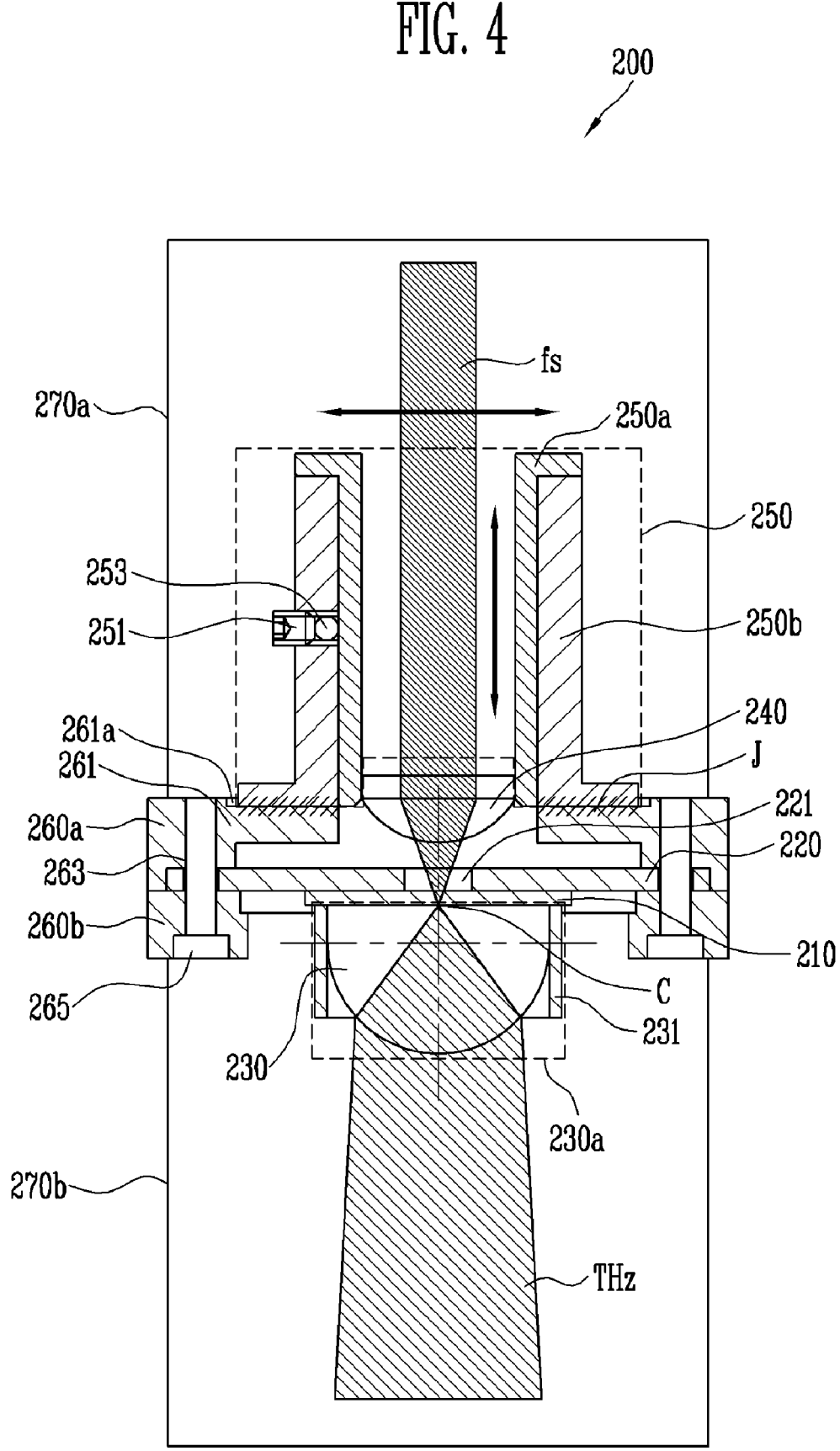
FIG. 4 illustrates a detailed structure of a terahertz wave Tx/Rx module package according to an exemplary embodiment of the present invention.
Figure 5:
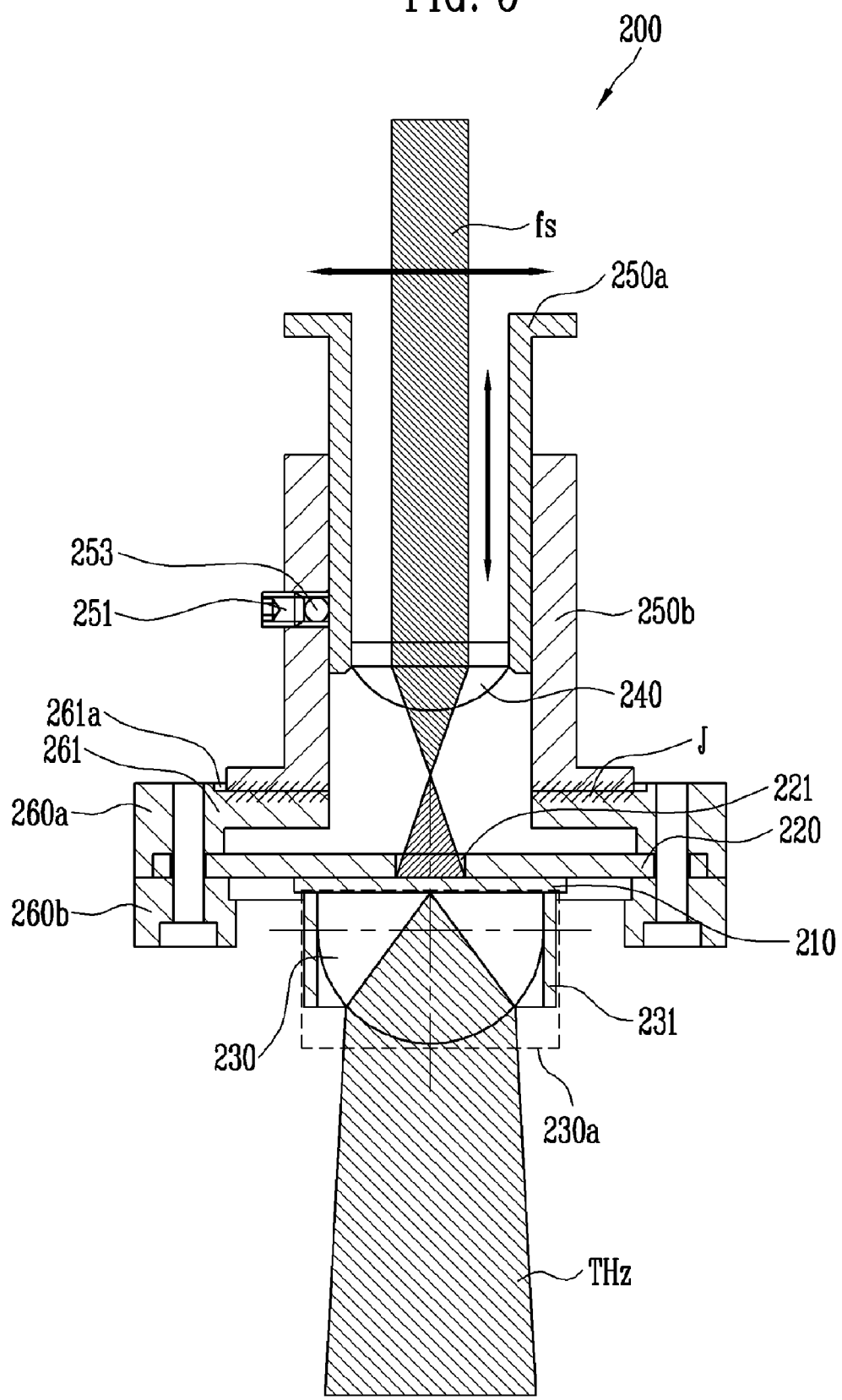
FIG. 5 illustrates operation of a terahertz wave Tx/Rx module package according to an exemplary embodiment of the present invention.

FIG. 4 illustrates a detailed structure of the terahertz wave Tx/Rx module package 200 according to an exemplary embodiment of the present invention, and FIG. 5 illustrates operation of the terahertz wave Tx/Rx module package 200 according to an exemplary embodiment of the present invention.

Referring to FIG. 4, the terahertz wave Tx/Rx module package 200 according to an exemplary embodiment of the present invention includes: the photoconductive antenna 220 formed on a substrate 210 to have an active region 221; the silicon ball lens 230 fixed under the substrate 210; the focusing lens 240 for focusing a femtosecond laser pulse; a focusing lens aligner 250 for aligning the focusing lens 240 with an active region center C of the photoconductive antenna 220; upper and lower fixers 260a and 260b for opening areas perpendicularly above and below the active region 221 of the photoconductive antenna 220; and upper and lower covers 270a and 270b sealing off the open areas of the upper and lower fixers 260a and 260b.

The active region 221 for terahertz wave radiation or detection is formed at the center of the photoconductive antenna 220, and an external terminal (not shown) may be connected with the active region center C of the photoconductive antenna 220.

The silicon ball lens 230 is fixed on a cylinder-shaped sleeve 231 surrounding the side surface of the silicon ball lens 230 and constitutes a ball lens block 230a together with the sleeve 231.

The upper and lower fixers 260a and 260b are configured to install and fix the photoconductive antenna 220 formed on the substrate 210 therein, and have a fastening hole 263 and a fastening screw 265 for fixing the photoconductive antenna 220. Also, the upper and lower fixers 260a and 260b open areas perpendicularly above and below the active region 221 of the photoconductive antenna 220.

The upper and lower covers 270a and 270b have the form of a cup whose upper surface is open and lower surface is sealed off, and are respectively combined with the upper and lower fixers 260a and 260b to seal off the open areas of the upper and lower fixers 260a and 260b.

The focusing lens aligner 250 includes an internal flange 250a having the focusing lens 240 installed therein and moving it up and down, and an external flange 250b formed to surround the internal flange 250a and moving the focusing lens 240 left and right.

The internal flange 250a moves the focusing lens 240 up and down using a fastening bolt 251 and a metal ball 253, and the external flange 250b moves the focusing lens 240 left and right in surface-contact J with a flange 261 of the upper fixer 260a.

In particular, the external flange 250b is inserted into a groove 261a formed on the flange 261 of the upper fixer 260a to move along the groove 261a, and thus can move the focusing lens 240 left and right.

As illustrated in FIG. 5, the focal position of the focusing lens 240 is changed by up and down movement of the internal flange 250a and left and right movement of the external flange 250b.

More specifically, the focusing lens aligner 250 having the focusing lens 240 installed therein adjusts the position of the focusing lens 240 up and down or left and right, thereby accurately aligning the center of the focusing lens 240 with the active region center C of the photoconductive antenna 220.

Meanwhile, after the center of the focusing lens 240 is accurately aligned with the active region center C of the photoconductive antenna 220, the external flange 250b may be fixed on the flange 261 of the upper fixer 260a using epoxy adhesive, a fixing bracket, etc., in order to keep the focusing lens 240 and the photoconductive antenna 220 aligned.

The terahertz wave Tx/Rx module package 200 having the above-described structure according to an exemplary embodiment of the present invention has the following advantages:

First, the photoconductive antenna 220, the silicon ball lens 230, and the focusing lens 240 can be simply aligned with high precision.

Since the photoconductive antenna 220, the silicon ball lens 230, and the focusing lens 240 are aligned with high precision, when a femtosecond laser pulse fs is incident on the focusing lens 240, it is accurately radiated to the active region center C of the photoconductive antenna 220, and a terahertz wave THz is generated by the photoconductive antenna 220. The generated terahertz wave THz is accurately focused onto a predetermined region through the silicon ball lens 230 and transformed into the frequency domain.

Since the terahertz wave Tx/Rx module package 200 according to an exemplary embodiment of the present invention can easily generate or measure a terahertz wave using a simpler structure than a conventional structure, it is possible to remarkably reduce time and cost required to build a terahertz wave generation and measurement system and to simplify and miniaturize the terahertz wave generation and measurement system.

Second, an external terminal (not shown) may be connected to the active region center C of the photoconductive antenna 220 so that characteristics of the terahertz wave THz generated by the photoconductive antenna 220 can be simply measured.

Thus, unlike conventional art, conductive adhesive or indium bonding is not required for a characteristic test. Accordingly, the test can be easily and simply performed, and also test time and cost can be remarkably reduced.

Third, the upper and lower covers 270a and 270b may be respectively combined with the upper and lower fixers 260a and 260b so that internal devices can be hermetically sealed for storage or transportation.

Accordingly, the terahertz wave Tx/Rx module package 200 can be stored and transported with the photoconductive antenna 220, the silicon ball lens 230 and the focusing lens 240 kept aligned as they are, and also it is possible to minimize pollution of the terahertz wave devices caused by surroundings.

A method of manufacturing the terahertz wave Tx/Rx module package 200 according to an exemplary embodiment of the present invention will be described below.

First, the photoconductive antenna 220 having the active region 221 for terahertz wave radiation or detection is formed on the substrate 210. At this time, the photoconductive antenna 220 may be formed to allow an external terminal to be connected with the active region center C of the photoconductive antenna 220.

Subsequently, the photoconductive antenna 220 formed on the substrate 210 is installed between the upper and lower fixers 260a and 260b. And then, the photoconductive antenna 220 is fixed in the upper and lower fixers 260a and 260b using a fastening means such as a combination of the fastening screw 265 and fastening hole 263. That is, the fastening screw 265 is threadedly engaged with the fastening hole 263 to fix the photoconductive antenna 220. At this time, areas perpendicularly above and below the active region 221 of the photoconductive antenna 220 are opened.

Subsequently, the hemispherical silicon ball lens 230 is epoxy-bonded to the cylinder-shaped sleeve 231, thereby forming the ball lens block 230a.

Subsequently, the ball lens block 230a is fixed under the substrate 210 by epoxy bonding.

Subsequently, the focusing lens 240 is installed in the internal flange 250a of the focusing lens aligner 250, and then the external flange 250b surrounding the internal flange 250a is brought into surface-contact J with the flange 261 of the upper fixer 260a.

Subsequently, the position of the focusing lens 240 is adjusted using the internal flange 250a and the external flange 250b so that the center of the focusing lens 240 is aligned with the active region center C of the photoconductive antenna 220. In other words, the focusing lens 240 is aligned with the photoconductive antenna 220 so that the femtosecond laser pulse fs incident on the focusing lens 240 is focused onto the active region center C of the photoconductive antenna 220.

When the focusing lens 240 is aligned with the photoconductive antenna 220 through the above-described process, the external flange 250b of the focusing lens aligner 250 and the flange 261 of the upper fixer 260a are fixed by epoxy adhesive.

Finally, the upper and lower covers 270a and 270b are respectively combined with the upper and lower fixers 260a and 260b according to necessity.

As described above, the complete and separate terahertz wave Tx/Rx module package 200 according to an exemplary embodiment of the present invention can be implemented by simply aligning the photoconductive antenna 220, the silicon ball lens 230 and the focusing lens 240. Accordingly, it is possible to remarkably reduce time and cost required to build a terahertz wave generation and measurement system, and simplify and miniaturize the terahertz wave generation and measurement system.

A terahertz wave Tx/Rx module package according to an exemplary embodiment of the present invention has the following advantages:

First, since a silicon ball lens, a photoconductive antenna and a focusing lens can be simply aligned with high precision, a terahertz wave can be easily generated or measured using a simpler structure than a conventional structure. Accordingly, it is possible to remarkably reduce time and cost required to build a terahertz wave generation and measurement system, and also simplify and miniaturize the terahertz wave generation and measurement system.

Second, characteristics of a terahertz wave generated by a photoconductive antenna can be simply measured by connecting an external terminal with an active region center of the photoconductive antenna. Accordingly, unlike conventional art, conductive adhesive or indium bonding is not required for a characteristic test. Thus, the test can be easily and simply performed, and test time and cost can be remarkably reduced.

Third, internal devices can be hermetically sealed for storage or transportation using upper and lower covers. Accordingly, the terahertz wave Tx/Rx module package can be stored and transported with a photoconductive antenna, a silicon ball lens and a focusing lens kept aligned as they are, and also it is possible to minimize pollution of the internal devices caused by surroundings.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A terahertz wave transmission and reception (Tx/Rx) module package, comprising:
    a photoconductive antenna formed on a substrate and having an active region in the middle of the photoconductive antenna;
    a silicon ball lens aligned under the substrate;
    a focusing lens for focusing a femtosecond laser pulse;
    a focusing lens aligner for aligning the focusing lens with an active region center of the photoconductive antenna;
    upper and lower fixers for opening areas perpendicularly above and below the active region of the photoconductive antenna; and
    upper and lower covers for sealing off the open areas of the upper and lower fixers.

2. The terahertz wave Tx/Rx module package of claim 1, wherein an external terminal is connected with the active region center of the photoconductive antenna.

3. The terahertz wave Tx/Rx module package of claim 1, wherein the silicon ball lens is fixed on a cylinder-shaped sleeve surrounding a side surface of the silicon ball lens.

4. The terahertz wave Tx/Rx module package of claim 1, wherein the focusing lens aligner includes:
    an internal flange having the focusing lens installed therein, and moving the focusing lens up and down; and
    an external flange formed to surround the internal flange, and moving the focusing lens left and right.

5. The terahertz wave Tx/Rx module package of claim 4, wherein the internal flange moves the focusing lens up and down using a fastening bolt and a metal ball.

6. The terahertz wave Tx/Rx module package of claim 4, wherein the external flange is inserted into a groove formed on a flange of the upper fixer for surface-contact and moves the focusing lens left and right along the groove.

7. The terahertz wave Tx/Rx module package of claim 6, further comprising an epoxy adhesive or a fixing bracket for fixing the external flange on the flange of the upper fixer.

8. The terahertz wave Tx/Rx module package of claim 1, further comprising a fastening means for fixing the photoconductive antenna to the upper and lower fixers.

9. The terahertz wave Tx/Rx module package of claim 1, wherein the upper cover seals off the open area of the upper fixer, and the lower cover seals off the open area of the lower fixer.

10. A method of manufacturing a terahertz wave transmission and reception (Tx/Rx) module package, the method comprising:
    forming a photoconductive antenna having an active region for terahertz wave radiation or detection on a substrate;
    opening areas perpendicularly above and below the active region of the photoconductive antenna using upper and lower fixers;
    aligning and fixing a silicon ball lens under the substrate;
    aligning a center of a focusing lens with an active region center of the photoconductive antenna using an internal flange capable of moving up and down and an external flange capable of moving left and right; and
    keeping the focusing lens and the photoconductive antenna aligned.

11. The method of claim 10, wherein the forming of the photoconductive antenna further comprises connecting an external terminal with the active region center of the photoconductive antenna.

12. The method of claim 10, wherein the opening of the areas perpendicularly above and below the active region comprises opening the areas perpendicularly above and below the active region of the photoconductive antenna while installing and fixing the photoconductive antenna in the upper and lower fixers.

13. The method of claim 10, wherein the aligning and fixing of the silicon ball lens further comprises fixing the silicon ball lens on a cylinder-shaped sleeve surrounding a side surface of the silicon ball lens.

14. The method of claim 10, wherein the aligning of the center comprises:
    installing the focusing lens in the internal flange, and then moving the internal flange up and down; and
    inserting the external flange surrounding the internal flange into a groove formed on a flange of the upper fixer for surface-contact, and then moving the external flange left and right along the groove.

15. The method of claim 14, wherein the keeping of the focusing lens comprises, after aligning the center of the focusing lens with the active region center of the photoconductive antenna, fixing the external flange on the flange of the upper fixer.

16. The method of claim 10, further comprising, after keeping the focusing lens, forming upper and lower covers sealing off the open areas of the upper and lower fixers.

* * * * *